United States Patent

[11] 3,572,040

[72] Inventor  Kuno Dreyer
              Munich, Germany
[21] Appl. No. 804,828
[22] Filed     Mar. 6, 1969
[45] Patented  Mar. 23, 1971
[73] Assignee  Messerschmitt-Bolkow Gesellschaft mit
               beschrankter Haftung
               Munich, Germany

[54] SOLID FUEL GAS GENERATOR
     1 Claim, 1 Drawing Fig.
[52] U.S. Cl..................................... 60/256,
                                                  60/39.82
[51] Int. Cl..................................... F02k 9/04
[50] Field of Search........................... 60/39.82
                                      (E), 256; 102/39

[56]            References Cited
           UNITED STATES PATENTS
2,720,749  10/1955  Beebe......................... 60/256
2,917,894  12/1959  Fox............................ 60/256
2,942,547   6/1960  Rabern et al. ............. 60/256X
3,446,017   5/1969  Bender et al................. 60/256X FOREIGN PATENTS
219,530  8/1958  Australia..................... 60/256

Primary Examiner—Douglas Hart
Attorney—McGlew and Toren

ABSTRACT: A gas generator, particularly a solid fuel rocket engine, comprises a cylindrical member which is closed at one end and includes thrust nozzle discharge at its opposite end. A solid charge of hollow cylindrical configuration is disposed within the combustion chamber intermediate its length and an igniting charge is located adjacent the closed inner wall of the combustion chamber. The ignition system for the engine includes a detonating cap which is located at the narrow section of the nozzle discharge and it forms a temporary dam to permit the buildup of pressure within the combustion chamber during the initial phase of ignition so that inflammation of the entire length of the interior portion of the cylindrical solid charge can take place. After the detonating cap is ignited, its ignition jet passes through the hollow charge to ignite the igniting charge at the closed end of the combustion chamber. A combustion gas is produced by the igniting charges flow through the hollow center of the hollow charge and when a sufficient pressure is attained, the burnt out housing of the detonating cap is ejected through the thrust nozzle.

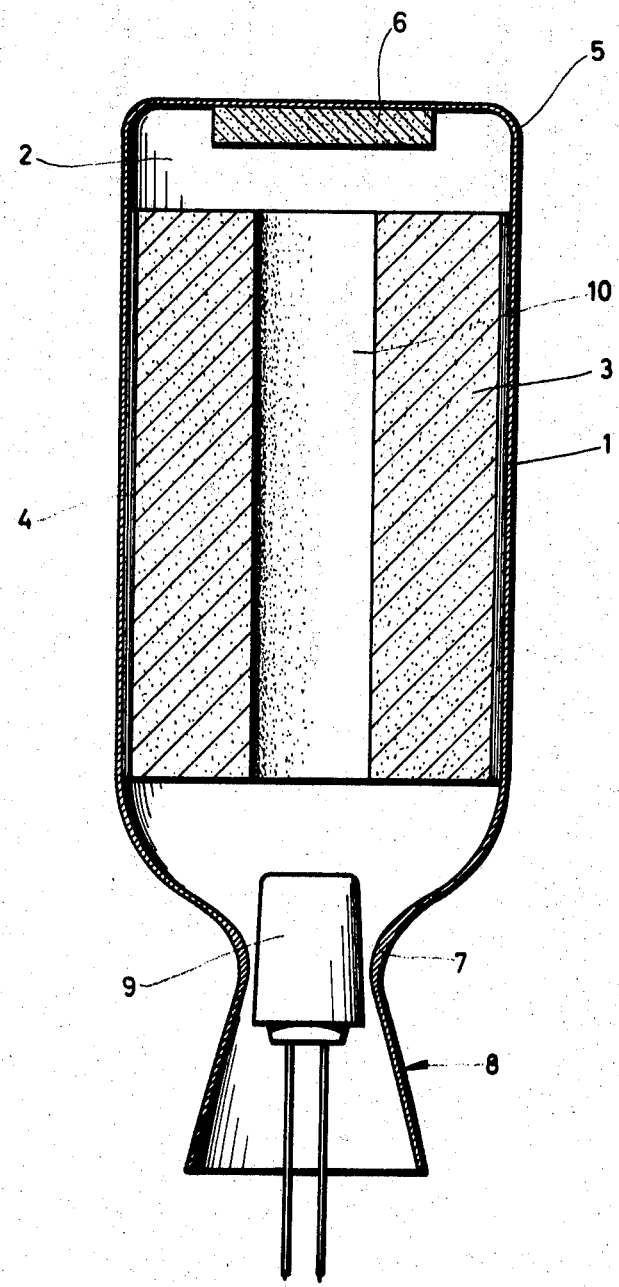
INVENTOR
Kuno Dreyer

SOLID FUEL GAS GENERATOR

SUMMARY OF THE INVENTION

This invention relates in general to the construction of gas generators, and in particular, to a new and useful solid fuel rocket engine having a hollow cylindrical solid charge therein and, an igniting charge at the closed end thereof, the ignition being facilitated by an igniting cap arranged in the discharge of the thrust nozzle, and partially blocking this area to permit an initial buildup of pressure within the combustion chamber at ignition.

At present, there are ignition systems for solid fuel rocket engines which are equipped with front burners and which comprise a detonating cap carrier that can be screwed onto the thrust nozzle or which forms a portion of the thrust nozzle. Such constructions may, for example, include a lock which is automatically released under the action of a predetermined pressure to expel the electrically operated detonating cap. When the rocket engine starts the detonating cap inflames the inside of the thrust nozzle and detonates an ignition charge arranged at the rear end of the thrust nozzle, which in turn also inflames the solid rocket composition. Due to the nozzle lock, a corresponding pressure is built up during the ignition process in the combustion chamber to provide inflammation of the solid rocket composition. It is also known to provide an ignition system which is installed in a tulip-shaped body of plastic material which includes a detonating cap arranged in a hub provided in the nozzle neck igniting charge facing the combustion chamber, and, wherein, the housing is covered by a diaphragm. The diaphragm forms a temporary dam at the combustion chamber outlet in order to achieve the necessary pressure buildup during the ignition phase. When the pressure necessary for the ignition is exceeded, the installation body is completely destroyed and its parts are ejected through the thrust nozzle into the open air. It is not impossible that the unburnt parts of the igniting charge will be ejected unused together with the fragments of the installation body, and this, of course, can be harmful. It is, therefore, necessary to dimension the igniting charge greater than is necessary for the ignition of the solid fuel in order to ensure the inflammation of the solid rocket composition. The parts of the igniting charge which have been ejected with fragments of the installation body will cause an increased hazard.

It is also known in the construction of rocket engines that solid fuel rocket charges designed as hollow burners and providing in the missile head in which the payload is arranged, a central tube which carries in it an igniting charge and an electric detonating cap. A perforated plate is arranged between the interior of the central tube and the interior of the solid rocket composition. This additional expenditure is necessary to prevent unburnt parts of the igniting charge from being ejected unused through the hollow space of the solid rocket composition by the pressure wave produced by the force of the detonating cap. Fragments of the igniting charge are to be retained by this perforated plate until they are completely burned so that only hot gasses can arrive through the perforated plate in the hollow space of the solid rocket composition. In addition, this known design arrangement of the ignition system results in a loss of installation space and an increase in the overall weight.

It is also known to provide a solid rocket engine having an igniting charge together with a detonating cap installed in front of the charge upon the inside of the front combustion chamber wall. The combustion of the igniting charge with the detonating cap involves the risk that the powder mask of the igniting charge adjacent to and in front of it will partly disintegrate into fragments, in accordance with its consistency and due to the pressure wave of the ignited detonating cap. Thus, the effect of the igniting charge on the solid rocket composition is reduced.

In accordance with the present invention there is provided a simple arrangement of the igniting system with an igniting charge arranged at one end of the combustion chamber adjacent the inner closed wall and facing the opposite thrust nozzle end. An igniting cap is arranged at the thrust nozzle end in a position to partially block the thrust gas discharge. The solid rocket fuel is designed as a hollow burner located between the igniting charge and the detonating cap, so that the ignition of the igniting charge by the detonating cap provides an inflammation of the solid charge composition. By arranging the igniting charge and the detonating cap so that they are separated by the main solid hollow burner charge composition it is possible to expose the entire hollow central area of the main charge to the combined action of the detonating cap and the igniting charge. The detonating cap which is arranged inside the thrust nozzle and provides a temporary dam which is secured in position at this location, and in one embodiment, will be ejected after a buildup of pressure in the combustion chamber. The construction permits the elimination of the disadvantages of the known arrangements while maintaining their advantages. The existence of the detonating cap at the location of the narrowest portion of the thrust nozzle provides a sufficient damming of the interior of the combustion chamber during the ignition phase. The fastening of the igniting charge on the inner side of the front combustion chamber wall together with the arrangement of the detonating cap in opposition thereto on the opposite end of the combustion chamber in the thrust nozzle portion ensures that the destruction of the igniting charge will not take place and also ensures a satisfactory ignition of the igniting charge so that the powder mass thereof will not be affected directly by the pressure wave of the detonating cap. In this manner the powder mass of the igniting charge can dissolve on the spot into hot ignition gasses which inflame the entire length of the solid charge composition as they pass therethrough. In addition, the explosive flame of the detonating cap passing through the hollow space of the solid charge composition also produces an ignition enhancing effect on the surface of the interior of the solid charge.

Accordingly, it is an object of the invention to provide an improved arrangement, of a solid fuel rocket combustion chamber or gas generator which comprises an igniting charge arranged at the inner closed end of the combustion chamber in opposition to an igniting cap arranged at the opposite end within the narrow section of the thrust nozzle, and which includes a hollow cylindrical charge arranged therebetween in a position such that the flame from the igniting cap can pass along the length thereof, and thereafter the flame from the igniting charge can ensure ignition of the entire length of the solid charge prior to the buildup of pressure within the combustion chamber to an extent to expel the igniting cap.

A further object of the invention is to provide a rocket engine construction which is simple in design, rugged in construction, and economical to manufacture.

The further features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWING

The only FIG. of the drawing is an axial sectional view of a rocket engine constructed in accordance with the invention.

GENERAL DESCRIPTION OF THE PREFERRED EMBODIMENT

Referring to the drawing in particular, the invention embodied therein comprises a rocket engine having a cylindrical housing 1 defining a combustion chamber 2.

In accordance with the invention, a solid propellant comprising a hollow-burner cylindrical solid composition 3 is located intermediate the length of the combustion chamber and is surrounded by an insulating layer 4. The solid charge 3 is designed as a hollow burner having a cylindrical passage 10 therethrough. On the inner side of the front or closed combustion chamber wall 5 is secured an igniting charge 6. Opposite to the igniting charge at a location aligned with the igniting charge and the passage 10 is an electric detonating cap 9. The electric detonating cap 9 is arranged within a thrust nozzle 8 at the narrowest portion 7 thereof.

The method of operation of the gas generator or rocket engine is as follows:

For starting the engine, the detonating cap 9 is ignited. The ignition jet or flame produced by the ignition of the detonating cap 9 passes through the passage 10 of the solid charge combustion 3 and hits the igniting charge 6 to cause the ignition of the latter.

The combustion of a powder mass of the igniting charge 6, produces hot gasses which flow through the hollow space 10 causing the ignition or inflaming of the solid charge composition 3 along its entire interior length. After ignition the solid charge 3 burns radially from the inside to the outside.

The detonating cap 9 forms during the initial phase of the ignition, a temporary dam so that the pressure can be built up in the combustion chamber 2 to an amount sufficient to permit inflammation of the solid composition 3. When a predetermined pressure is obtained, the burned out housing of the detonating cap 9 is ejected through the rear portion of the thrust nozzle 8.

The invention is not limited to a rocket engine construction per se, but any type gas generator for the production of pressure gases or propellant gases which may be used, for example, for driving turbines, or other types of machines.

I claim:

1. A gas generator comprising a housing having a closed end and an opposite discharge end, a solid charge of hollow tubular configuration having a passage defined therethrough and designed as a hollow burner being located within said housing between said discharge end and said closed end and spaced from said closed end, an igniting charge mounted in said housing adjacent said closed end in a position to influence said hollow charge along said passage after it is ignited and burned, a consumable electrically actuated detonating cap disposed in the discharge end of said housing and said housing is substantially cylindrical, said igniting charge comprising a relatively flat charge having a radial extent greater than said passage, said discharge including a thrust nozzle having a narrow neck portion and an outwardly flaring opened end portion, said detonating cap being located within the narrow neck portion of said thrust nozzle in alignment with the opening through said solid charge and in alignment with said igniting charge.